Nov. 10, 1942.   A. VISCHER, JR   2,301,724
PRESSURE RELIEF DEVICE
Filed May 18, 1938
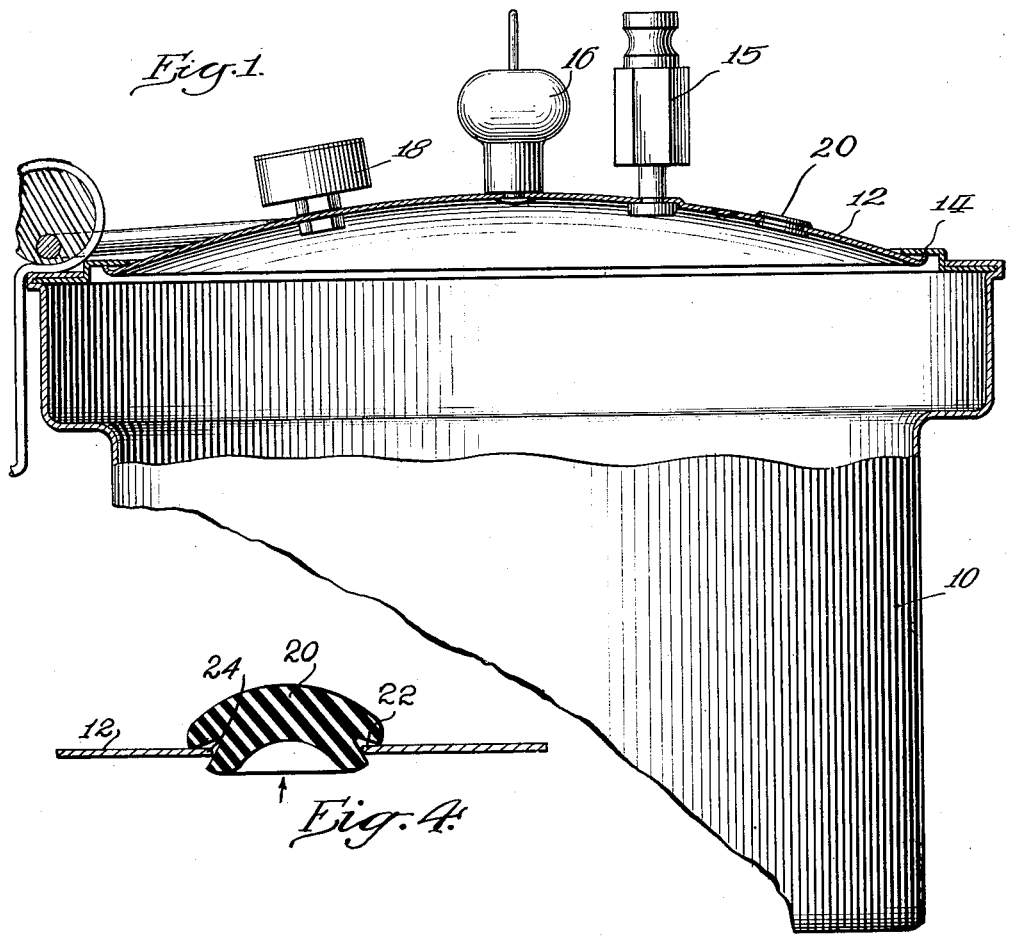
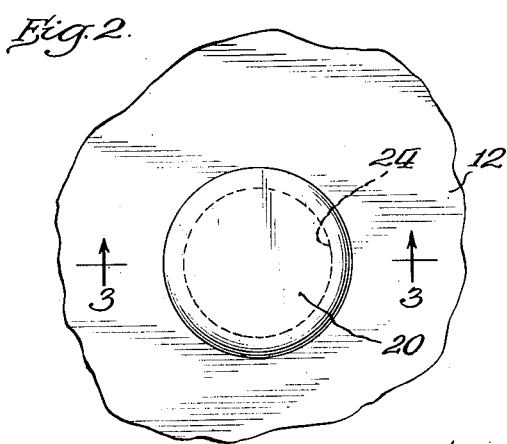
Inventor:
Alfred Vischer Jr.
By Williams, Bradbury, McCaleb & Hinkle
Attys.

Patented Nov. 10, 1942

2,301,724

UNITED STATES PATENT OFFICE 2,301,724

PRESSURE RELIEF DEVICE

Alfred Vischer, Jr., Park Ridge, Ill., assignor to Vischer Products Company, Chicago, Ill., a corporation of Illinois Application May 18, 1938, Serial No. 208,534

10 Claims. (Cl. 220—44)

My invention relates generally to devices for relieving the pressure in a container when a predetermined maximum pressure is exceeded. The device is particularly applicable for use with pressure cookers and the like, wherein it is desirable to have a safety device which will prevent the building up of excessive pressures within the cooker.

It is therefore an object of my invention to provide an improved means for relieving the fluid pressure in a container whenever the pressure exceeds a predetermined maximum value.

A further object is to provide an improved pressure relief or pop-off valve device which is simple in construction, which may be used repeatedly, which may be economically manufactured, and which will be reliable in operation.

Other objects will appear from the following description, reference being had to the accompanying drawing in which:

Figure 1 is a fragmentary sectional view of a pressure cooker, being representative of any container subjected to internal fluid pressure in which it is desired to prevent the internal pressure from exceeding a predetermined maximum value;

Figure 2 is a fragmentary plan view of a portion of the container cover, including the pressure relief valve;

Figure 3 is a transverse sectional view taken on the line 3—3 of Figure 2; and,

Figure 4 is a transverse sectional view of the plug showing the shape assumed by it when one side of it is subjected to pressure.

In various types of containers which are adapted to contain fluids under pressure, it is desirable to provide some kind of pressure relief device which will serve as a pop-off or safety valve to prevent the building up of a pressure within the container exceeding that for which the container is designed, and thereby prevent deformation or possible bursting of the container, with resultant damage to the container and its surroundings, as well as possible injury to users of the container.

Particularly in pressure cookers, which are usually used by persons unfamiliar with the properties of steam and the dangers of excessive steam pressure, it is desirable to provide means which will absolutely preclude the possibility of explosion of the cooker. In the past various forms of pressure relief means have been provided, the most common form of such device being a fusible plug of soft metal which will melt at a predetermined temperature and thus permit the escape of steam. Such plugs are practical, but must be renewed after they have been melted, whereas the plug of my invention may be reinserted after having been blown from the container and used for an indefinite length of time.

Referring to the drawing, Figure 1 shows a pressure cooker of the general type disclosed in my co-pending application, Serial No. 108,197, filed October 29, 1936, (which has matured into Patent No. 2,282,011, granted May 5, 1942), comprising a kettle 10 having a cover 12 which seals against an inwardly directed flange 14 forming part of the kettle. The cover is provided with a suitable handle 16 and pressure gauge 18, and may also be provided with the usual safety valve 15, which permits escape of steam at the operating pressure of, for example, 15 lbs./in.$^2$ Inasmuch, however, as the usual pressure relief valve may become clogged with fragments of food, or may otherwise be rendered inoperable to relieve the pressure whenever it exceeds the assumed maximum of 15 lbs./in.$^2$, it is desirable, and common practice in the pressure cooker art, to provide an additional means to relieve the steam pressure when it exceeds a value of, for example, 25 lbs./in.$^2$ In accordance with my invention, the latter pressure relief means comprises a disc 20 made of a soft synthetic rubber such as "Duprene", "neoprene" or perbunan. This disc is provided with a central annular peripheral groove 22 in its edge, and, as best shown in Figure 3, the disc is inserted in a suitable aperture 24 formed in the cover 12 so that the portion of the cover surrounding the aperture 24 is received by the groove 22.

The disc 20 is sufficiently flexible and elastic that is may be easily inserted in the cover aperture as shown in Figure 3, and will be forced therefrom whenever the internal pressure exceeds the given maximum pressure. When the disc has been forced from the aperture, and after the conditions which produced the excess of pressure have been corrected, the plug may be replaced merely by reinserting it in the aperture of the cover.

The surfaces of the plug surrounding the groove 22 may be suitably finished so that the rubber-like composition will not become bonded to the metal cover, and the composition is, of course, of such nature that it will not be affected by temperatures in the order of 260° Fahrenheit at which it is to operate, and such that it will have a long and useful life. It will be readily apparent that the cost of the safety device is very low, that the device is so simple that its operation will be readily understood by the ordinary user, and that its usefulness is not impaired by having been subjected to excesses of pressure a large number of times.

It will be apparent to those skilled in the art that the disc 20 need not necessarily be made of the exact shape and form disclosed herein, it being necessary merely that the portion which resists outward movement be sufficiently strong to hold the plug in position against the desired maximum pressure. The pressure acting on the inner surface of the plug presses the overlying portion of the plug against the inner surface of the cover and thereby frictionally holds the plug in place until the force due to the pressure over the area represented by the aperture is sufficient to overcome the frictional grip of the flange as well as to overcome the resiliency and resistance to deformation inherent in the plug. The other requirement of the plug is that it have some means to hold it in position so that the peripheral edge of the inner surface engages the inner surface of the cover and thus forms an abutment and an initial seal. When the pressure becomes excessive the plug may be forcibly ejected from the aperture, and it is therefore desirable that the plug be made of a relatively soft rubber-like material. Being of soft material, it will, when forcibly projected from the cover, be incapable of damaging the wall or ceiling of the room, or of injuring the user of the cooker. The plug is oil and grease resistant. It is preferably, although not necessarily, symmetrical, so that it is immaterial which face of the plug is exposed to pressure.

The operation of the plug is illustrated in Figure 4, showing the shape assumed by the plug when it is subjected to appreciable internal pressure. In this figure, the plug is deformed nearly sufficiently to permit its expulsion from the cover 12. If subjected to slightly greater pressure, it will be further deformed until the inner flange thereof is compressed sufficiently to slide through the opening 24.

While I have shown and described the invention as applied to pressure cookers, it will be apparent to those skilled in the art that its utility is not limited in this respect, but that it may be used with a wide variety of containers which are subjected to internal (or external) fluid pressure, and that while but a single embodiment of the invention is disclosed, it may be embodied in a wide variety of forms, all capable of accomplishing substantially the same result in substantially the same way. I therefore do not wish my invention to be limited to the precise construction disclosed, but, instead, intend to include, within the scope of the following claims, all such equivalent constructions.

I claim:

1. A safety device for a container having an aperture therein, said device comprising an imperforate relatively soft elastic plug of grease-resistant material capable of substantially maintaining its physical properties at a temperature in the order of 260° Fahrenheit of substantially greater diameter than that of the opening in the container, and having a peripheral groove of a root diameter substantially equal to that of said opening, said plug being insertable in said opening with a portion thereof overlying the edge of said opening.

2. A fluid pressure relief device for containers provided with an opening to receive the device, said device consisting of a plug made of a composition rubber-like material capable of withstanding temperatures in the order of 260° Fahrenheit without appreciable changes in its elastic properties, said plug having the portion thereof which is subjected to pressure of greater diameter than the opening and having a portion projecting through said opening.

3. A pressure relief plug for containers subjected to fluid pressure comprising a disc of synthetic rubber-like material having a peripheral annular groove which is adapted to receive a portion of the wall of the container surrounding an aperture therein and through which the plug is insertable.

4. A pressure cooker comprising a fluid-tight container having an aperture in one of the walls thereof, and a disc of soft rubber-like material, resisting the action of grease and temperatures in the order of 260° Fahrenheit without substantial change in its elastic properties, having a portion projecting through said opening, and having a laterally extending flange overlying an appreciable portion of the inner surface of the wall surrounding said opening.

5. A pressure relief plug for containers subjected to fluid pressure comprising a disc of relatively soft, flexible rubber-like material resistant to change in its physical properties by the action of temperatures in the order of 260° Fahrenheit symmetrical about the axis of rotation of the disc and about a central plane perpendicular to said axis, said disc having a central annular groove formed in the edge thereof.

6. In a pressure cooker formed of a closed container having an aperture therein, means for relieving the pressure when it attains a predetermined value, comprising an imperforate synthetic rubber element closing said aperture, said element having a flange engaging part of said container around said aperture thereby to hold said element in position to close said aperture until said predetermined pressure is attained, said flange being sufficiently elastic to yield when said pressure is attained and to permit said element to be forced from engagement with said container part.

7. In a pressure cooker formed of a closed container having an aperture forming a passageway for the escape of steam from the container, said aperture being in a part having an inwardly facing seating surface around it, means for maintaining the pressure within the container until it attains a predetermined value and then relieving the pressure, comprising an element closing said aperture, said element being made of a soft rubber-like material capable of withstanding temperatures in the order of the boiling point of water and being highly resistant to deterioration by oils and greases, said element having the peripheral portion thereof engaging and held against said seating surface by a force derived from the fluid pressure within the container, the portion engaging said seating surface being sufficiently elastic to yield when said element is subjected to a predetermined pressure, and thereby permit said element to be forced from its position closing said aperture.

8. A pressure cooker comprising a container having an opening therein forming a passageway for the escape of steam therefrom to the atmosphere, and an element normally closing said opening, said element being made of a synthetic rubber-like material capable of withstanding temperatures in the order of those of the boiling point of water and being highly resistant to deterioration by oils and greases, said element being sufficiently elastic that when subjected to steam pressure in the container in the order of fifteen to twenty pounds per square inch, it will yield and be deformed to permit escape of steam from said container through said opening.

9. The combination of a closed vessel subjected to internal fluid pressure caused by boiling aqueous material therein, and having an aperture above the level of said aqueous material, and a soft resilient safety plug having a flange to engage the inside of said vessel normally sealing said aperture and proportioned to be ejected therefrom by said fluid pressure when said pressure exceeds a predetermined maximum value, thereby to release said pressure, said plug being composed of a synthetic rubber resistant to deterioration and change in elastic properties by the action of grease and temperatures in the order of 260° Fahrenheit.

10. The combination of a container for cooking foods under pressure, said container having an aperture and being subjected to fluid pressure generated by heating of the fluids therein, and a safety pressure relief device comprising a closure element of a synthetic rubber which does not materially change its elastic properties under the influence of grease and temperatures in the order of 260° Fahrenheit, said element normally preventing the flow of fluid through said aperture and having a flange engaging and held against a seating surface on said container, said flange being proportioned to be disengaged by the influence of a dangerously high pressure in said container to permit fluid to flow through said aperture, thereby releasing said pressure.

ALFRED VISCHER, JR.

DISCLAIMER 2,301,724.—*Alfred Vischer, Jr.*, Park Ridge, Ill. PRESSURE RELIEF DEVICE. Patent dated Nov. 10, 1942. Disclaimer filed Aug. 27, 1947, by the assignee, *Flex-Seal Corporation*.

Hereby enters this disclaimer to claims 8, 9, and 10 in said specification.

[*Official Gazette September 30, 1947.*]